United States Patent
Chandra et al.

(10) Patent No.: US 11,553,362 B2
(45) Date of Patent: *Jan. 10, 2023

(54) CROSS-RELAY INTERFERENCE MITIGATION IN WIRELESS RELAYS THAT SERVE WIRELESS USER DEVICES

(71) Applicant: T-Mobile Innovations LLC, Overland Park, KS (US)

(72) Inventors: Amrit Kumar Chandra, Ashburn, VA (US); Liang Li, Darnestown, MD (US); Charles Anthony Manganiello, Paola, KS (US); Kristian Kai Johns, Ashburn, VA (US); David Z. Sun, Broadlands, VA (US); Jay Ronald Chernoff, Pawleys Island, SC (US); Neehar Shrikant Kulkarni, Herndon, VA (US); Mayur Shirwadkar, Arlington, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,156

(22) Filed: Oct. 14, 2021

(65) Prior Publication Data
US 2022/0038193 A1    Feb. 3, 2022

Related U.S. Application Data

(63) Continuation of application No. 16/443,917, filed on Jun. 18, 2019, now Pat. No. 11,206,560.

(51) Int. Cl.
*H04W 24/08* (2009.01)
*H04B 17/345* (2015.01)
(Continued)

(52) U.S. Cl.
CPC .......... *H04W 24/08* (2013.01); *H04B 17/318* (2015.01); *H04B 17/345* (2015.01);
(Continued)

(58) Field of Classification Search
None
See application file for complete search history.

(56) References Cited

U.S. PATENT DOCUMENTS

| 7,336,930 | B2 | 2/2008 | Larsson et al. |
| 7,826,541 | B2 | 11/2010 | Fujii et al. |
(Continued)

FOREIGN PATENT DOCUMENTS

| CN | 107251618 A | 10/2017 |
| WO | 2016176825 A1 | 11/2016 |

*Primary Examiner* — Christopher M Crutchfield

(57) ABSTRACT

In a wireless communication relay, a network transceiver wirelessly detects wireless access points. The network transceiver beamforms wireless test signals and wirelessly transmits the beamformed wireless test signals to the wireless access points. A user transceiver in the relay wirelessly detects cross-relay interference levels when the network transceiver wirelessly transmits the beamformed wireless test signals to the wireless access points. The user transceiver transfers the cross-relay interference levels for the wireless access points to the network transceiver. The network transceiver selects one of the wireless access points based on the cross-relay interference levels for the wireless access points. The network transceiver wirelessly exchanges user data with the selected one of the wireless access points and exchanges the user data with the user transceiver. The user transceiver exchanges the user data with the network transceiver and wirelessly exchanges the user data with the wireless user devices.

20 Claims, 7 Drawing Sheets

(51) Int. Cl.
*H04B 17/318* (2015.01)
*H04L 45/00* (2022.01)
*H04L 47/125* (2022.01)
*H04L 69/22* (2022.01)

(52) U.S. Cl.
CPC ............ *H04L 45/22* (2013.01); *H04L 47/125* (2013.01); *H04L 69/22* (2013.01)

(56) References Cited

U.S. PATENT DOCUMENTS

| | | |
|---|---|---|
| 7,962,091 B2 | 6/2011 | Oyman et al. |
| 8,135,337 B2 | 3/2012 | Larsson |
| 9,185,711 B2 | 11/2015 | Lin et al. |
| 2005/0227619 A1 | 10/2005 | Lee et al. |
| 2008/0070510 A1 | 3/2008 | Doppler et al. |
| 2013/0252650 A1 | 9/2013 | Halbauer et al. |
| 2016/0249373 A1 | 8/2016 | Celebi et al. |
| 2018/0279202 A1 | 9/2018 | Tenny et al. |
| 2018/0309502 A1 | 10/2018 | Khandani |
| 2019/0116548 A1 | 4/2019 | Dudzinski et al. |

CROSS-RELAY INTERFERENCE MITIGATION IN WIRELESS RELAYS THAT SERVE WIRELESS USER DEVICES

RELATED CASES

This United States patent application is a continuation of U.S. patent application Ser. No. 16/443,917 that was filed on Jun. 18, 2019 and is entitled "CROSS-RELAY INTERFERENCE MITIGATION IN WIRELESS RELAYS THAT SERVE WIRELESS USER DEVICES." U.S. patent application Ser. No. 16/443,917 is hereby incorporated by reference into this United States patent application.

TECHNICAL BACKGROUND

Wireless communication networks provide wireless data services like voice-calling, internet-access, and machine control to wireless user devices like phones, computers, and robots. The wireless communication networks have wireless access points that exchange wireless signals with the wireless user devices. The wireless signals transport user data and network signaling. The wireless access points exchange the user data and network signaling with core network elements to help deliver the wireless data services. Exemplary wireless communication networks include Fifth Generation New Radio (5GNR), Long Term Evolution (LTE), and Institute of Electrical and Electronic Engineers (IEEE) 802.11 (WIFI).

To extend the range of the wireless data services, the wireless communication networks use wireless relays between the wireless user devices and the wireless access points. The wireless relays exchange wireless signals with the wireless user devices that carry network signaling and the user data. The wireless relays also exchange wireless signals with the wireless access points that carry network signaling and the user data.

An exemplary wireless relay comprises a Node-B and a Relay-User Equipment (R-UE). The Node-B uses 5GNR, LTE, or WIFI to communicate with the wireless user devices. The R-UE uses 5GNR, LTE, or WIFI to communicate with the wireless access points. The Node-B and the R-UE communication with one another over a network link. In some wireless communication networks, wireless relays link together to form a chain back to a large wireless access point. The wireless relays in the chain and the wireless access point all serve wireless user devices as they move about.

In a wireless relay, the node-B receives wireless signals from the wireless user devices, and the R-UE transmits wireless signals to the wireless access points. When the R-UE and the node-B are operating in the same frequency band, these R-UE transmissions can interfere with the node-B receptions, and vice versa, so interference mitigation measures are taken. The node-B and the R-UE may be separated by distance or shielding which can be difficult or inefficient. The node-B and the R-UE may use different frequencies or times which can also be inefficient. Unfortunately, wireless relays do not efficiently mitigate cross-relay interference when serving the wireless user devices.

TECHNICAL OVERVIEW

In a wireless communication relay, a network transceiver wirelessly detects wireless access points. The network transceiver beamforms wireless test signals and wirelessly transmits the beamformed wireless test signals to the wireless access points. A user transceiver in the relay wirelessly detects cross-relay interference levels when the network transceiver wirelessly transmits the beamformed wireless test signals to the wireless access points. The user transceiver transfers the cross-relay interference levels for the wireless access points to the network transceiver. The network transceiver selects one of the wireless access points based on the cross-relay interference levels for the wireless access points. The network transceiver wirelessly exchanges user data with the selected one of the wireless access points and exchanges the user data with the user transceiver. The user transceiver exchanges the user data with the network transceiver and wirelessly exchanges the user data with the wireless user devices.

DETAILED DESCRIPTION

Figure 1:
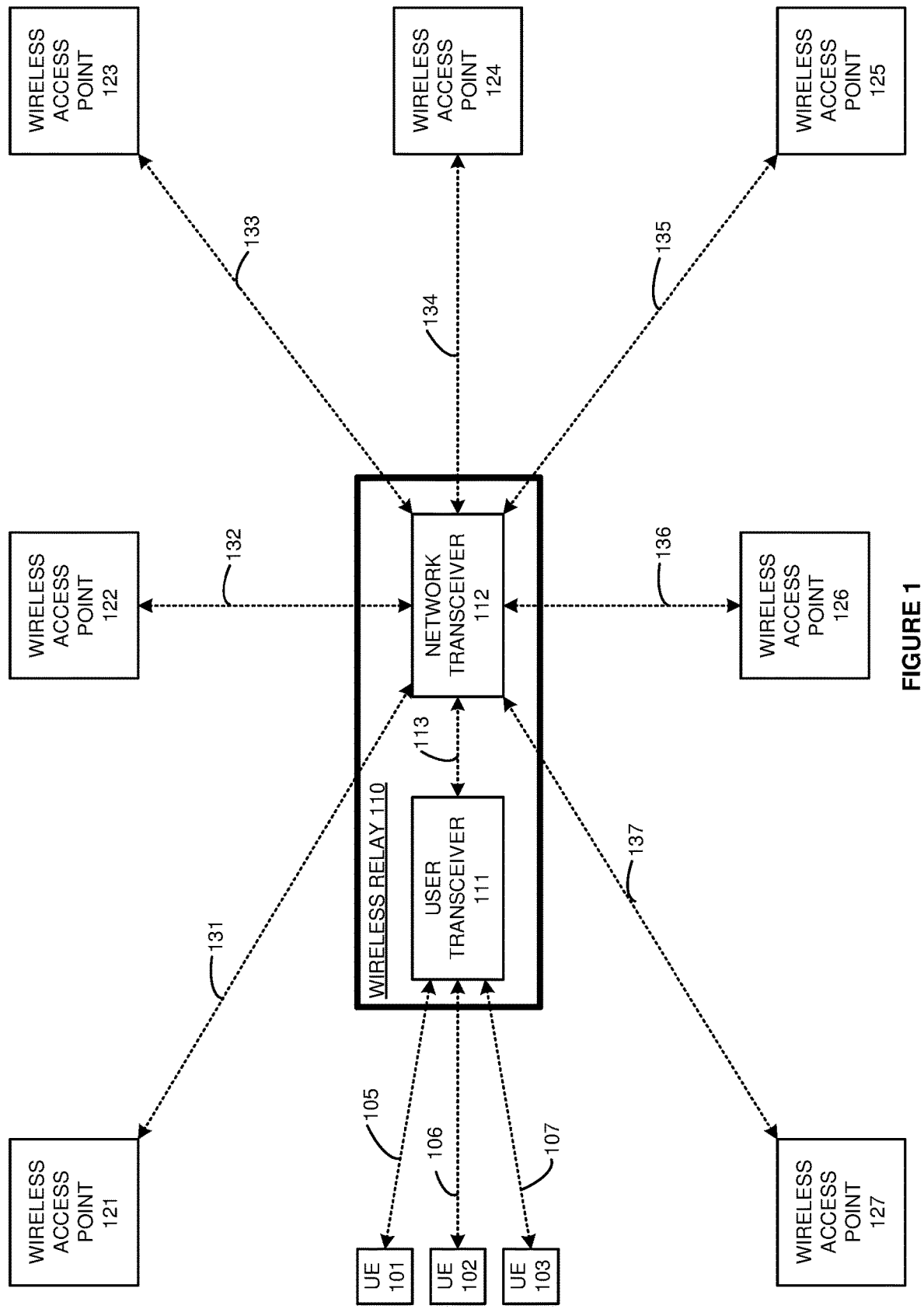
FIG. 1 illustrates a wireless relay that mitigates cross-relay interference when serving wireless User Equipment (UEs).

FIG. 1 illustrates wireless relay 110 that mitigates cross-relay interference when serving wireless User Equipment (UEs) 101-103. Wireless relay 110 serves UEs 101 with data services like internet-access, voice-calling, messaging, and machine communications. Wireless relay 110 comprises user transceiver 111 and network transceiver 112 that are coupled over data link 113. User transceiver 111 and network transceiver 112 are usually collocated on the same structure like a tower or building.

User transceiver 111 wirelessly exchanges user data with UEs 101-103 over wireless access links 105-107. Network transceiver 112 wirelessly exchanges the user data with at least some of wireless access points 121-127 over wireless network links 131-137. Wireless access links 105-107 and network links 131-137 may use Fifth Generation New Radio (5GNR), Long Term Evolution (LTE), International Institute of Electrical and Electronics (IEEE) 802.11 (WIFI), and/or the like.

UEs 101-103 might be phones, computers, robots, vehicles, sensors, and/or the like. UEs 101-103 comprise radio circuitry and user circuitry. The radio circuitry comprises antennas, modulators, amplifiers, filters, digital/analog interfaces, microprocessors, memory, and bus connections. The user circuitry comprises microprocessors, memory, user interfaces, and bus connections. The memory stores an operating system, network applications, and user applications. In some examples, the network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP). In UEs 101-103, the microprocessors execute the operating system, network applications, and user applications to wirelessly exchange user data with user transceiver 111 over wireless access links 105-107.

In wireless relay 110, user transceiver 111 comprises antennas, modulators, amplifiers, filters, digital/analog interfaces, microprocessors, memory, transceivers, and bus connections. Network transceiver 112 comprises microprocessors, memory, transceivers, and bus connections. The microprocessors may comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories may comprise Random Access Memory (RAM), flash circuitry, disk drives, and/or the like. The memories store operating systems and network applications. In some examples, the network applications comprise PHY, MAC, RLC, PDCP, RRC, and SDAP. In transceivers 111-112, the microprocessors execute the operating systems and network applications to wirelessly exchange user data with UEs 101-103 over wireless access links 105-107 and to exchange the user data with wireless access points 121-127 over wireless network links 131-137.

Wireless access points 121-127 comprise antennas, modulators, amplifiers, filters, digital/analog interfaces, microprocessors, memory, transceivers, and bus connections. The memories store operating systems and network applications. In some examples, the network applications comprise PHY, MAC, RLC, PDCP, RRC, and SDAP. In wireless access points 121-127, the microprocessors execute the operating systems and network applications to exchange user data with network transceiver 112 and to exchange the user data with other network elements (not shown). Exemplary network elements comprise Fifth Generation Core (5GC) Access and Mobility Management Function (AMF), 5GC User Plane Function (UPF), LTE Mobility Management Entity (MME), LTE Serving Gateway (SGW), and WIFI router.

Before serving UEs 101-103 with the data services over wireless access links 105-107, wireless relay 110 initially establishes at least one of wireless network links 131-137. To establish one or more wireless network links 131-137, network transceiver 112 wirelessly detects wireless access points 121-127—typically with a 360 degree pilot signal scan. Network transceiver 112 determines the signal strengths for the wireless signals from wireless access points 121-127. Network transceiver 112 wirelessly transmits test signals to wireless access points 121-127.

When network transceiver 112 wirelessly transmits the test signals to wireless access points 121-127, user transceiver 111 detects cross-relay interference levels. The cross-relay interference levels may comprise signals transmitted by network transceiver 112. User transceiver 111 transfers the cross-relay interference levels for wireless access points 121-127 to network transceiver 112. Network transceiver 112 then uses the reported interference levels to calculate the interference level it would receive from the transmitter of user transceiver 111. Network transceiver 112 selects at least one of wireless access points 121-127 based on their respective signal strengths, signal quality, and also their calculated cross-relay interference levels from user transceiver 111. For example, network transceiver 112 typically selects the wireless access point that has: 1) a cross-relay interference level below a threshold, and 2) the best signal strength and/or quality among the wireless access points having the calculated cross-relay interference level below the threshold.

Network transceiver 112 then exchanges network signaling with the selected one of wireless access points 121-127 to establish the respective one of wireless network links 131-137. User transceiver 111 exchanges access signaling with UEs 101-103 to establish wireless access links 105-107. User transceiver 111 wirelessly exchanges user data with UEs 101-103 over wireless access links 105-107. User transceiver 111 exchanges the user data with network transceiver over network link 113. Network transceiver 112 wirelessly exchanges the user data with the selected one of wireless access points 121-127 over the corresponding one of wireless network links 131-137. The selected one of wireless access points 121-127 exchanges the user data with the network elements to deliver the data services to UEs 101-103.

While serving UEs 101-103 with the data services over the wireless access links, wireless relay 110 reselects wireless access points 121-127. Network transceiver 112 may again detect wireless access points 121-127 with another 360 degree pilot signal scan. Network transceiver 112 again determines signal strengths for the pilot signals. Network transceiver 112 wirelessly transmits test signals to wireless access points 121-127. During service delivery, network transceiver 112 may use user data or network signaling as the test signals.

Network transceiver 112 selects at least one of wireless access points 121-127 based on the signal strengths, SINRs, calculated cross-relay interference levels, or other radio metrics. For example, network transceiver 112 may select the wireless access point that has the best SINR among the access points which also have pilot signal strength above a threshold and a calculated cross-relay interference level below a threshold. Network transceiver 112 then exchanges network signaling and user data with the selected one of wireless access points 121-127 over the corresponding one of links 131-137. The selected one of wireless access points 121-127 exchanges the user data with the other network elements to deliver the data services to UEs 101-103.

In some examples, wireless relay 110 performs an optimization process during access point selection. Network transceiver 112 may beamform the test signals using different beamforming matrices. Network transceiver 112 correlates cross-relay interference levels reported by user transceiver 111 to the different beamforming matrices and calculates the cross-relay interference levels it would receive from user transceiver 111. Network transceiver 112 selects the wireless access points based on their signal strength, signal quality, and their calculated cross-relay interference levels based on the beamforming. After the selection, network transceiver 112 wirelessly exchanges user data with the selected wireless access point using the specific beamforming matrix which corresponds to the optimal access point based on a selection algorithm.

In a like manner, network transceiver 112 may switch the test signal antennas using different switch antenna positions. Network transceiver 112 correlates cross-relay interference levels reported by user transceiver 111 to the different switch antenna positions. Network transceiver 112 selects the wireless access points based on their signal strengths, signal quality, and their calculated cross-relay interference levels based on the switch antenna positions. After the selection, network transceiver 112 wirelessly exchanges user data with the selected wireless access point using the specific switch position which corresponds to the optimal access point based on a selection algorithm.

Network transceiver 112 may physically move the test signal antennas to different antenna positions. Network transceiver 112 correlates cross-relay interference levels reported by user transceiver 111 to the different antenna positions. Network transceiver 112 selects the wireless access points based on their signal strengths, signal quality, and their calculated cross-relay interference levels based on the antenna positions. After the selection, network transceiver 112 wirelessly exchanges user data with the selected wireless access point using the specific antenna position which corresponds to the optimal access point based on a selection algorithm.

If network transceiver 112 is not able to find an optimal access point because the calculated cross-relay interference levels are too high, it may direct user transceiver 111 to reduce the maximum transmit power level so that the calculated cross-relay interference levels may fall below a threshold and network transceiver 112 is able to select an access point. After the selection, network transceiver 112 wirelessly exchanges user data with the selected wireless access point and user transceiver 111 transmit power will be limited to a certain level.

Advantageously, wireless relay 110 efficiently and effectively mitigates cross-relay interference when serving wireless UEs 101-103.

Figure 2:
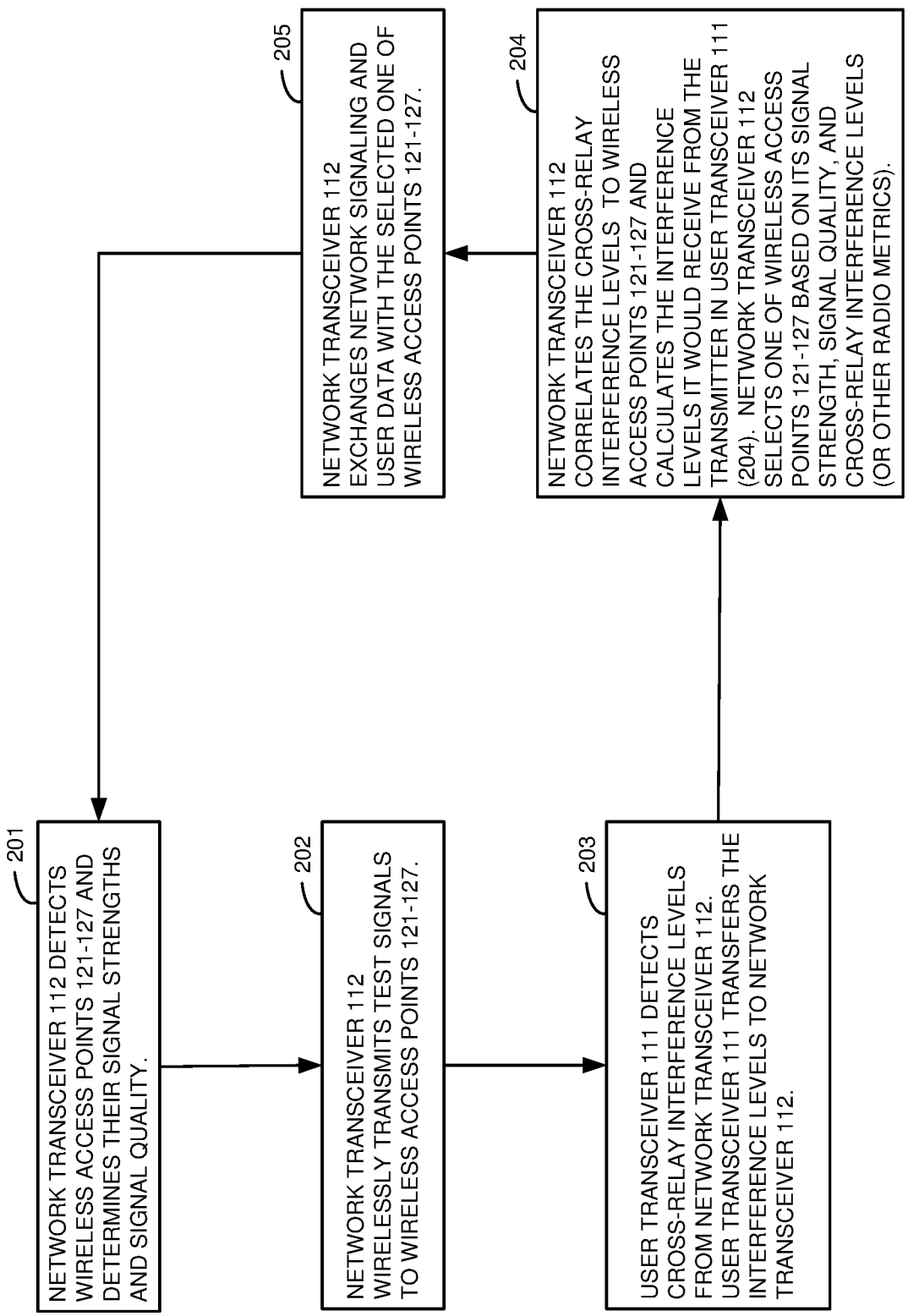
FIG. 2 illustrates the operation of the wireless relay to mitigate cross-relay interference when serving the wireless UEs.

FIG. 2 illustrates the operation of wireless relay 110 to mitigate cross-relay interference when serving wireless UEs 101-103. Network transceiver 112 detects wireless access points 121-127 and determines their signal strengths and quality (201). Network transceiver 112 wirelessly transmits test signals to wireless access points 121-127 (202). User transceiver 111 detects cross-relay interference levels for the wireless access links (203). User transceiver 111 transfers the cross-relay interference levels to network transceiver 112 (203). Network transceiver 112 correlates the cross-relay interference levels to wireless access points 121-127 and calculates the cross-relay interference level it would receive from the transmitter of user transceiver 111 (204). Network transceiver 112 selects one of wireless access points 121-127 based on its signal strength, SINR, and calculated cross-relay interference levels or other radio metrics (204). For example, network transceiver 112 may select the wireless access point 123 because it has the best signal strength for wireless access points that also correlate to a SINR above a SINR threshold and a calculated cross-relay interference level below a certain threshold. Network transceiver 112 then exchanges network signaling and user data with the selected one of wireless access points 121-127 (205). The process repeats (201).

Figure 3:
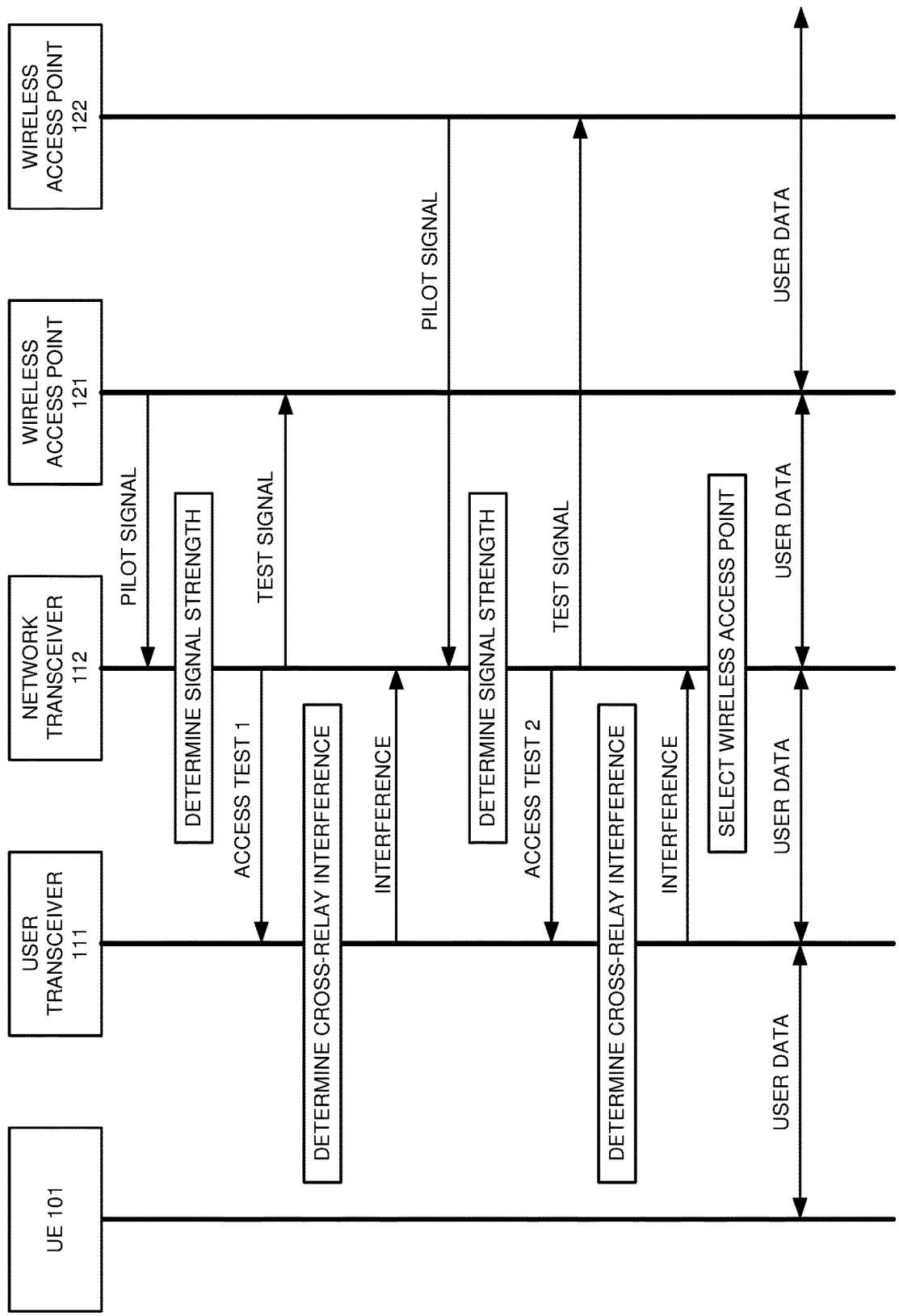
FIG. 3 illustrates the operation of the wireless relay to mitigate cross-relay interference when serving the wireless UEs.

FIG. 3 illustrates the operation of wireless relay 110 to mitigate cross-relay interference when serving wireless UE 101. Network transceiver 112 detects the pilot signal from wireless access point 121. Network transceiver 112 determines the pilot signal strength for wireless access point 121. Network transceiver 112 instructs user transceiver 111 to perform access test 1. Network transceiver 112 wirelessly transmits a test signal to wireless access point 121, and at the same time, user transceiver 111 detects a cross-relay interference level from network transceiver 112. User transceiver 111 transfers the cross-relay interference level for access test 1 to network transceiver 112. Network transceiver 112 correlates the cross-relay interference level for access test 1 to wireless access point 121 and calculates the cross-relay interference level it would receive from the transmitter of user transceiver 111.

Network transceiver 112 then detects the pilot signal from wireless access point 122. Network transceiver 112 determines the pilot signal strength for wireless access point 122. Network transceiver 112 instructs user transceiver 111 to perform access test 2. Network transceiver 112 wirelessly transmits a test signal to wireless access point 122, and at the same time, user transceiver 111 detects a cross-relay interference level from network transceiver 112. User transceiver 111 transfers the cross-relay interference level for access test 2 to network transceiver 112. Network transceiver 112 correlates the cross-relay interference level for access test 2 to wireless access point 122 and calculates the cross-relay interference level it would receive from the transmitter of user transceiver 111. Transceivers 111-112 perform similar tests for wireless access points 123-127.

Network transceiver 112 selects one of wireless access points 121-127 based on its signal strength, SINR, and calculated cross-relay interference levels. In this example, network transceiver 112 selects wireless access point 121 because it has the best signal strength among access points 121-122, and only access points 121-122 have a SINR above the SINR threshold and calculated cross-relay interference levels below a threshold. Network transceiver 112 exchanges user data with selected wireless access point 121. The wireless access point selection process to mitigate cross-relay interference may be continuously or periodically repeated.

Figure 4:
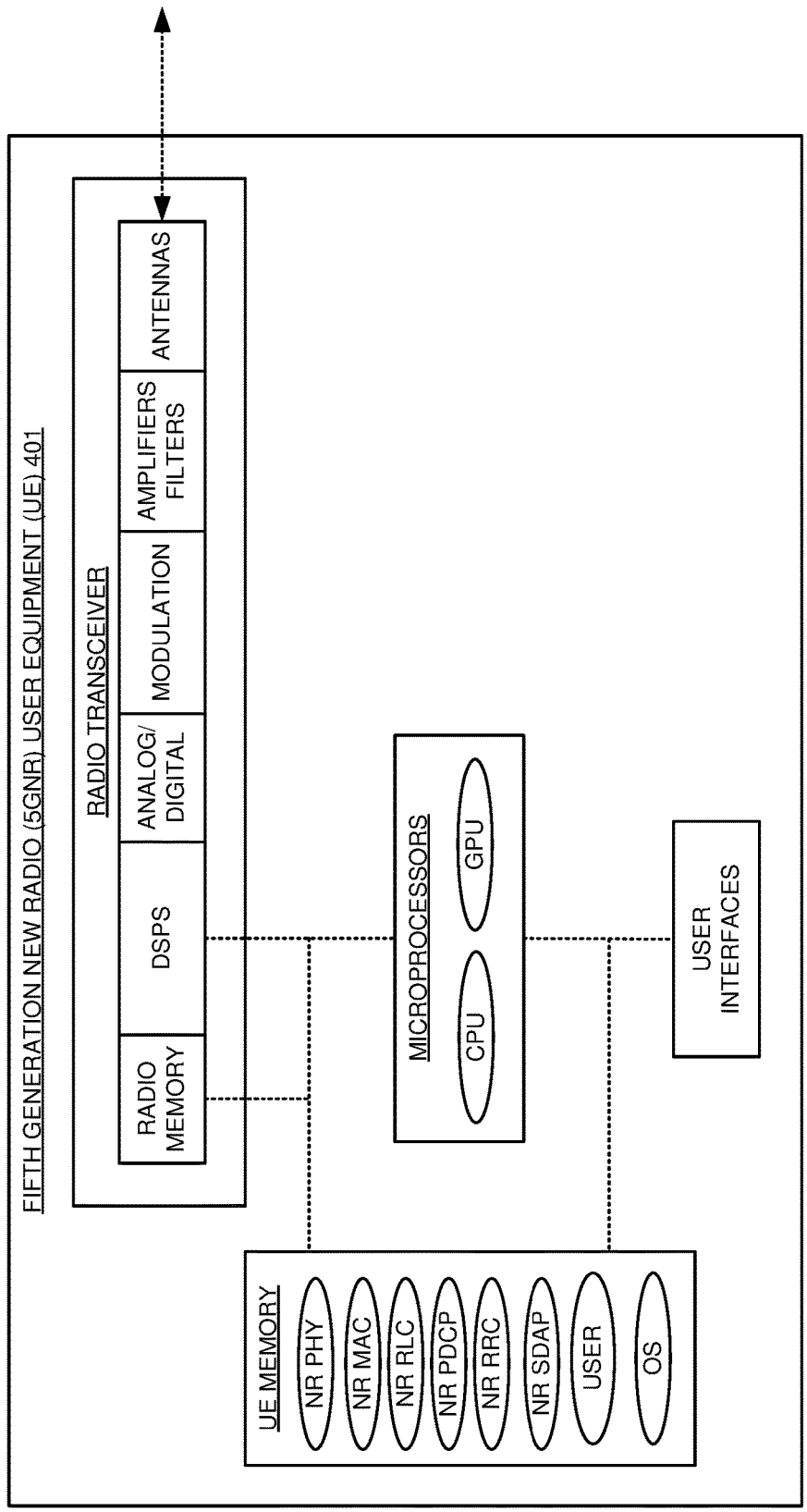
FIG. 4 illustrates a Fifth Generation New Radio (5GNR) UE that is served by a 5GNR relay which mitigates cross-relay interference.

FIG. 4 illustrates Fifth Generation New Radio (5GNR) UE 401 that is served by 5GNR relays which mitigate cross-relay interference. NR UE 400 is an example of UEs 101-103 although UEs 101-103 may differ. 5GNR UE 400 comprises microprocessors, UE memory, user interfaces, and a radio transceiver that are coupled together over bus circuitry and/or some other data links. The microprocessors comprise CPUs, GPUs, and/or some other computer circuitry. The UE memory comprises volatile and non-volatile data storage like RAM, flash, and/or disc. The UE memory stores an operating system (OS), network applications, and user applications. The network applications comprise NR PHY, NR MAC, NR RLC, NR PDCP, NR RRC, and NR SDAP. The radio transceiver comprises antennas, duplexers, amplifiers/filters, modulation, analog/digital interfaces, DSPs, and radio memory. The user interfaces may comprise transceivers, machine controllers, graphic displays, sensors, cameras, and/or some other user components.

The microprocessors execute the operating system and user applications to store Uplink (UL) user data and user signaling in the UE memory. In 5GNR gNodeB 511, the microprocessors execute the NR RRC to process DL RRC/N1 signaling to generate corresponding UL RRC/N1 signaling. The microprocessors execute the NR PHY, MAC, RLC, PDCP, RRC, and SDAP to generate and store corresponding UL signals that carry UL RRC data and UL RRC/N1 signaling in the radio memory of the radio transceiver. In the radio transceiver, the DSPs process the UL RRC data and UL RRC/N1 signaling to transfer corresponding digital UL signals to the analog/digital interface. The analog/digital interface converts the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless UL signals that transport the UL RRC data and UL RRC/N1 signaling to 5GNR relays.

In the radio transceiver, the antennas receive wireless Downlink (DL) signals that transport RRC data and RRC/N1 signaling from the 5GNR relays. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSPs. The DSPs recover DL data from the digital DL signals. The DSPs transfer the DL data to the UE memory. The microprocessors execute the network applications to process the DL data to recover the DL RRC data and DL RRC/N1 signaling. The microprocessors execute the network applications to transfer corresponding DL user data and user signaling to the user applications.

The NR SDAP maps between RRC data and data Service Data Units (SDUs). The NR RRC maps between RRC/N1 signaling and signaling SDUs. The NR SDAP and RRC exchange their SDUs with the NR PDCP. The NR PDCP maps between the SDUs and Protocol Data Units (PDUs). The NR PDCP exchange the PDUs with the NR RLC. The NR RLC maps between the PDUs and MAC logical channels. The NR RLC exchanges the user data and network signaling with the NR MAC over the MAC logical channels. The NR MAC maps between the MAC logical channels and MAC transport channels. The NR MAC exchanges the user data and network signaling with the PHYs over the MAC transport channels. The NR PHY maps between the MAC transport channels and PHY transport channels. The NR PHY exchanges the RRC data and RRC/N1 signaling with the NR PHYs in the 5GNR relays over the PHY transport channels.

RRC functions also comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 5:
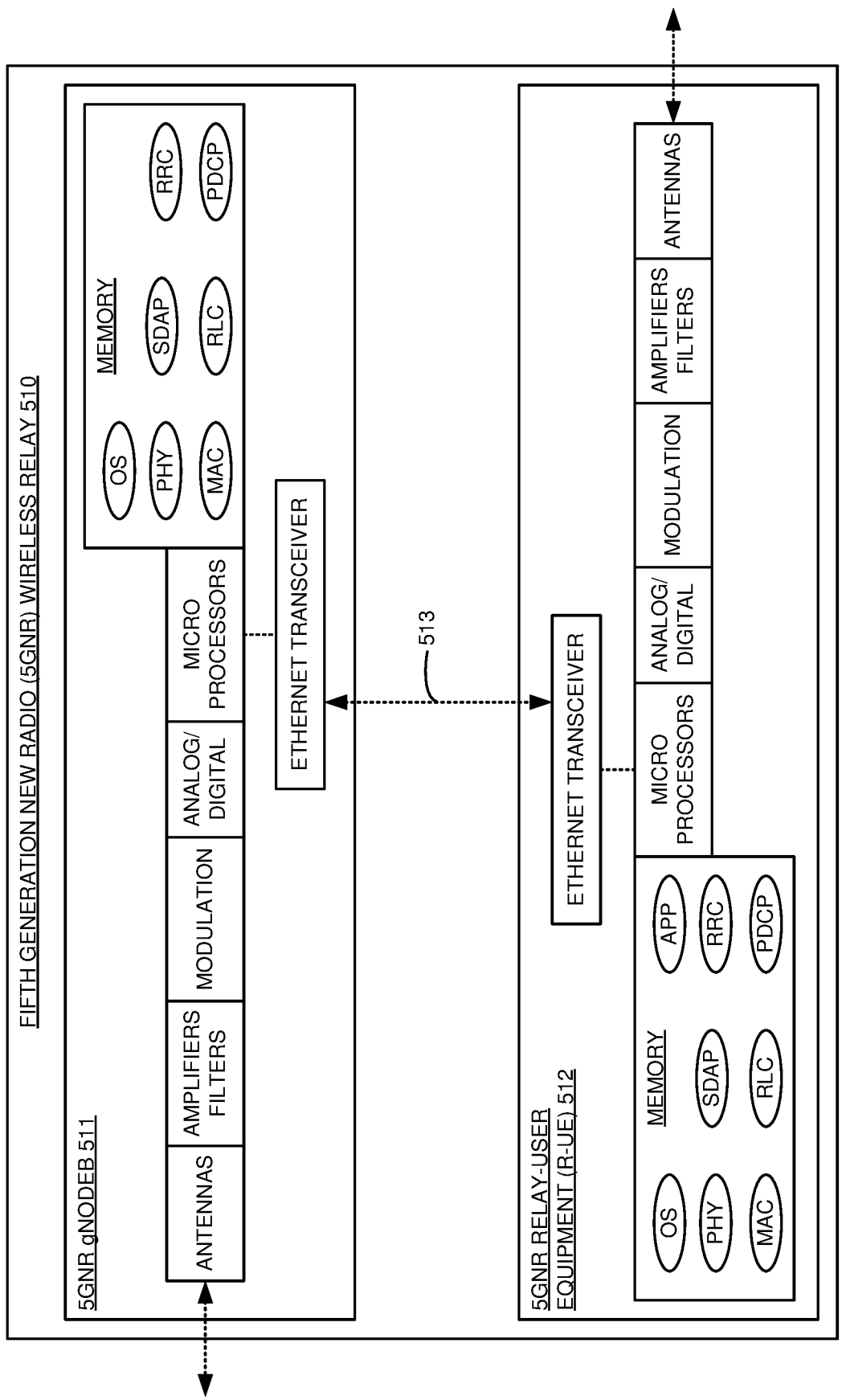
FIG. 5 illustrates a 5GNR relay that mitigates cross-relay interference.

FIG. 5 illustrates 5GNR wireless relay 510 that mitigates cross-relay interference. 5GNR relay 510 comprises an example of wireless relay 110, although relay 110 may differ. 5GNR relay 510 comprises 5GNR gNodeB 511, 5GNR Relay-User Equipment (R-UE) 512, and network link 513. 5GNR gNodeB 511 and 5GNR R-UE 512 each comprise antennas, amplifiers/filters, modulation, analog/digital interfaces, microprocessors, memory, and an ethernet transceiver that are coupled over bus circuitry and/or some other data links. The microprocessors comprise DSPs, CPUs, GPUs, and/or some other computer circuitry. The memories comprise volatile and non-volatile memories like RAM, flash, and/or the like. The memories store operating systems and network applications like PHY, MAC, RLC, PDCP, RRC, and SDAP.

In 5GNR gNodeB 511, the antennas receive wireless Uplink (UL) signals that transport RRC data and RRC/N1 signaling from 5GNR UEs. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the microprocessors. The microprocessors execute the NR PHY, MAC, RLC PDCP, RRC, and SDAP to recover UL RRC data and UL RRC/N1 signaling from the UL signals. The NR SDAP processes UL RRC data to generate corresponding UL user data. The NR RRC processes the UL RRC signaling and DL N2 signaling to generate corresponding UL N2 signaling and DL RRC signaling. The NR SDAP transfers the UL user data to 5GNR R-UE 512 for delivery to the 5GNR wireless access points. The NR RRC transfers the UL N2/N1 signaling to 5GNR R-UE 512 for delivery to the 5GNR wireless access points as UL user data.

In 5GNR R-UE 512, the microprocessors execute the NR RRC to process DL RRC/N1 signaling to generate corresponding UL RRC/N1 signaling. The microprocessors execute the NR PHY, MAC, RLC, PDCP, RRC, and SDAP to generate corresponding UL signals that carry UL RRC data and UL RRC/N1 signaling. The UL RRC data carries the UL user data and the UL N2/N1 signaling from gNodeB 511 and UE 401. The microprocessors transfer the corresponding UL signals to the analog/digital interfaces which convert the digital UL signals into analog UL signals for modulation. Modulation up-converts the UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless UL signals that transport the UL RRC data and UL RRC/N1 signaling to the 5GNR access points.

Unfortunately, the wireless UL signals that are transmitted from 5GNR R-UE 512 to the 5GNR access points may interfere with the wireless UL signals that are received from 5GNR gNodeB 511 by the 5GNR UEs.

In 5GNR R-UE 512, the antennas receive wireless DL signals from 5GNR access points that transport RRC data and N2/N1 signaling. The DL RRC data carries user data and N2/N1 signaling for gNodeB 511 and UE 401. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the microprocessors. The microprocessors execute the NR PHY, MAC, RLC PDCP, RRC, and SDAP to recover DL RRC data and DL RRC signaling from the DL signals. The NR RRC processes DL RRC/N1 signaling to generate corresponding UL RRC/N1 signaling. The NR SDAP transfers the DL user data which includes the DL N2/N1 signaling for gNodeB 511 and UE 401 to 5GNR gNodeB 511.

In 5GNR gNodeB 511, the microprocessors execute the NR RRC to process the DL N2 signaling and the UL RRC signaling to generate corresponding DL RRC signaling and UL N2 signaling. The microprocessors execute the NR PHY, MAC, RLC, PDCP, RRC, and SDAP to generate corresponding DL signals that carry the DL RRC data and DL RRC/N1 signaling. The microprocessors transfer the corresponding DL signals to the analog/digital interfaces which convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless DL signals that transport the DL RRC data and RRC/N1 signaling to the 5GNR UEs.

In 5GNR gNodeB 511 and R-UE 512, the NR RRCs map between the RRC signaling and signaling SDUs. The NR SDAPs map between the RRC data and data SDUs. The NR RRCs and SDAPs exchange their SDUs with the NR PDCPs. The NR PDCPs map between the SDUs and PDUs. The NR PDCPs exchange the PDUs with the NR RLCs. The NR RLCs map between the PDUs and MAC logical channels. The NR RLCs exchange user data and network signaling with the NR MACs over the MAC logical channels. The NR MACs map between the MAC logical channels and MAC transport channels. The NR MACs exchange user data and network signaling with the NR PHYs over the MAC transport channels. The NR PHYs map between the MAC transport channels and PHY transport channels. The NR PHYs exchange user data and network signaling with the NR PHYs in the 5GNR UEs and in the 5GNR access points over the PHY transport channels.

RRC functions comprise authentication, security, handover control, network selection, status reporting, QoS, and network pages and broadcasts. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In particular, the RRC in R-UE 512 initiates an access point test in response to power-up, a network instruction, a schedule, or some other test trigger. In R-UE 512, the DSP and PHY process DL signals to detect pilot signal strength (if any) in the frequency channel at the azimuth range. In this scan, 5GNR access point 621 is detected and its wireless signal strength is determined. In response to access point detection, the NR RRC or some other network application in R-UE 512 signals the NR RRC (or some other network application) in gNodeB 511 to perform an interference test for a specified frequency channel and report the results. The NR-RRC (or the other network application) in R-UE 512 transmits a test signal to 5GNR access point 621—which access point 621 may or may not acknowledge. The test signal may be a dummy signal, network signaling, user data, or some other wireless signal directed to 5GNR access point 621.

In 5GNR gNodeB 511, the DSP and PHY process UL signals to detect interference in the specified frequency channel. The UL signals may comprise ambient signals, dummy signals, network signaling, user data, or some other wireless signals. The PHY in 5GNR gNodeB 511 transfers the detected interference level for the test to its RRC (or some other network application) which signals the interference level to the RRC (or another network application) in R-UE 512. The RRC in R-UE 512 repeats the test for additional azimuth ranges until 360 degrees have been covered.

In R-UE 512, the RRC selects a set of the detected wireless access points that report interference levels that are below an interference threshold. The RRC then selects a primary wireless access point from the set that has the best signal strength, and the RRC may select a secondary wireless access point from the set that has the next best signal strength. The RRC exchanges RRC/N1 signaling with the selected wireless access point(s) to establish wireless network link(s). The SDAP exchanges RRC data with the selected wireless access point(s) over the wireless network link(s).

Figure 6:
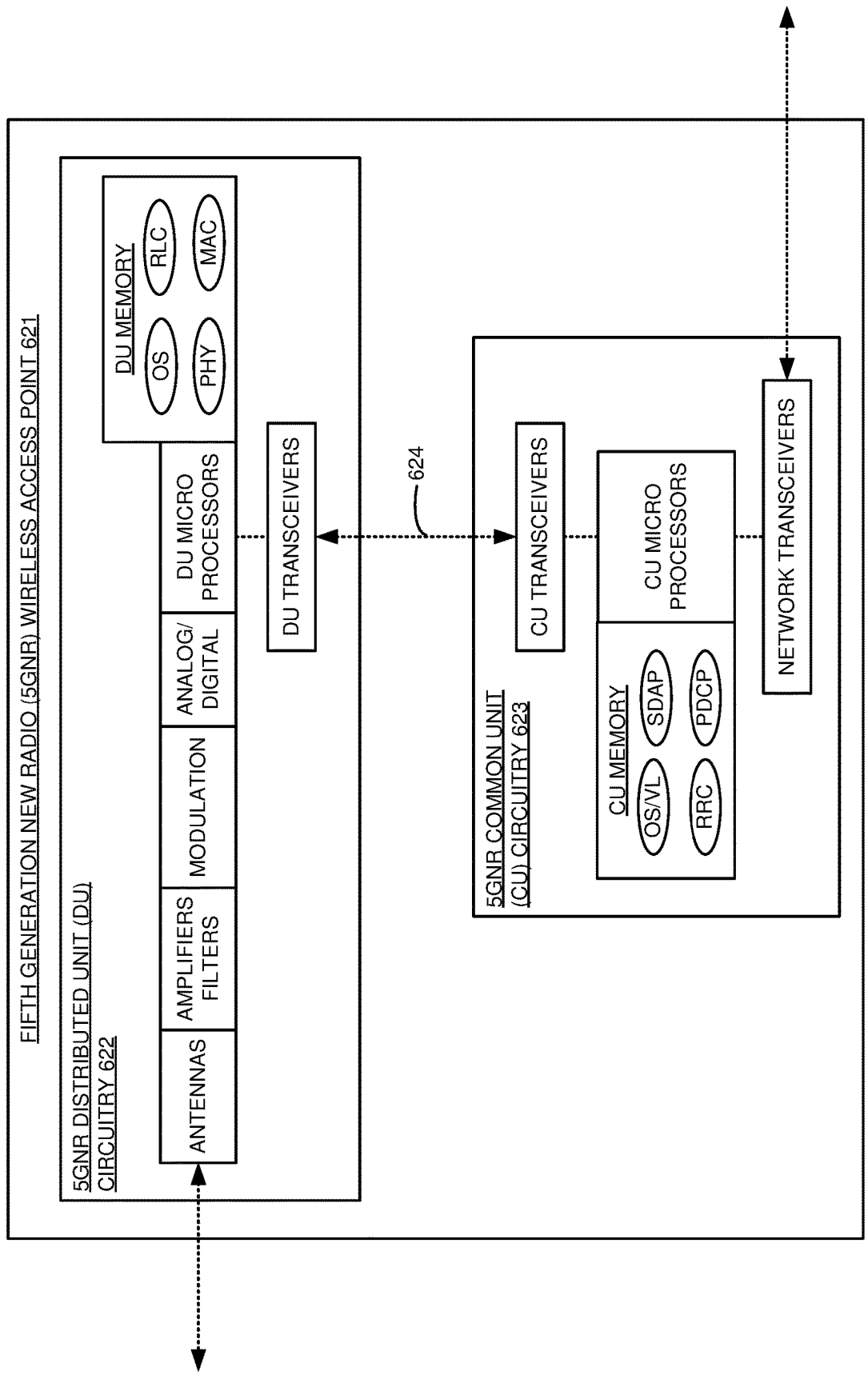
FIG. 6 illustrates a 5GNR access point which serves a 5GNR relay that mitigates cross-relay interference.

FIG. 6 illustrates 5GNR access point 621 which serves 5GNR relays that mitigate cross-relay interference. 5GNR access point 621 comprises an example of access points 121-127, although access points 121-127 may differ. 5GNR access point 621 comprises 5GNR Distributed Unit (DU) circuitry 622, Centralized Unit (CU) circuitry 623, and network link 624. 5GNR DU circuitry 622 comprises antennas, amplifiers/filters, modulation, analog/digital interfaces, DU microprocessors, DU memory, and DU transceivers that are coupled over bus circuitry and/or some other data links. 5GNR CU circuitry 623 comprises CU microprocessors, CU memory, CU transceivers, and network transceivers that are coupled over bus circuitry and/or some other data links. The antennas in 5GNR DU circuitry 622 are coupled to 5GNR relays and UEs over wireless NR links. The network transceivers in 5GNR CU circuitry 623 are coupled to network elements like Access and Mobility Management Function (AMF) and User Plane Functions (UPF).

In circuitry 622-623, the microprocessors comprise DSPs, CPUs, GPUs, and/or some other computer circuitry. The memories comprise volatile and non-volatile memories like RAM, flash, and/or the like. The memories store operating systems and network applications like PHY, MAC, RLC, PDCP, RRC, and SDAP. The CU memory also stores virtual layer (VL) components like hypervisor modules, virtual switches, virtual machines, and/or the like. In this example, 5GNR DU circuitry 622 hosts the network applications for NR PHY, NR MAC, and NR RLC while 5GNR CU circuitry 623 hosts the network applications for NR PDCP, NR RRC, and NR SDAP. In other examples, DU circuitry 622 and CU circuitry 623 may use other network application splits.

In 5GNR DU circuitry 622, the antennas receive wireless UL signals from 5GNR relays that transport RRC/N1 signaling and RRC data (having UL N2/N1 signaling from gNodeB 511 and UE 401). The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DU microprocessors. The DU microprocessors execute the NR PHY, NR MAC, and NR RLC to recover UL PDUs from the UL signals. The DU microprocessors transfer the UL PDUs from the DU memory to the CU memory in CU circuitry 623 over DU/CU link 624. In 5GNR CU circuitry 623, the CU microprocessors execute the NR PDCP, NR RRC, and NR SDAP to recover UL N3 data, N2 signaling, and N1 signaling from the UL PDUs. The microprocessors execute the NR RRC to process the DL N2 signaling and the UL RRC signaling to generate corresponding DL RRC signaling and UL N2 signaling. The microprocessors execute the NR PHY, MAC, RLC, PDCP, RRC, and SDAP to generate corresponding UL signals that carry the UL N3 data (having N2/N1 signaling from gNodeB 511 and UE 401) and UL N1 signaling from R-UE 511 from the CU memory to network elements like AMF and UPF.

In 5GNR CU circuitry 623, the CU microprocessors receive and store DL N3 data (having N2/N1 signaling for gNodeB 511 and UE 401) and N1 signaling from the network elements in the CU memory. The CU microprocessors execute the NR SDAP, NR RRC, and NR PDCP to process the DL N3 data and N1 signaling to transfer DL PDUs with corresponding RRC data and RRC/N1 signaling to the DU memory in DU circuitry 622 over DU/CU link 624. In NR DU circuitry 623, the DU microprocessors execute the NR RLC, NR MAC, and NR PHY to process the DL PDUs and generate corresponding digital DL signals for the analog/digital interface. In DU circuitry 623, the analog/digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through the duplexers to the antennas. The electrical DL signals drive the antennas to emit corresponding wireless DL signals that transport the DL RRC data and RRC/N1 signaling to 5GNR relays.

The NR RRC exchanges N2 signaling with AMFs and exchanges RRC/N1 signaling with wireless relays. The NR RRC maps between the network signaling and signaling SDUs. The NR SDAP maps between the N3 data and RRC data SDUs. The NR RRC and SDAP exchange their SDUs with the NR PDCP. The NR PDCP maps between the SDUs and PDUs. The NR PDCP exchanges the PDUs with the NR RLC over link 624. The NR RLC maps between the PDUs and MAC logical channels. The NR RLC exchanges RRC data and RRC/N1 signaling with the NR MAC over the MAC logical channels. The NR MAC maps between the MAC logical channels and MAC transport channels. The NR MAC exchanges user data and network signaling with the NR PHY over the MAC transport channels. The NR PHY maps between the MAC transport channels and PHY transport channels. The NR PHY exchanges RRC data and RRC/N1 signaling with NR PHYs in 5GNR relays over the PHY transport channels.

RRC functions comprise authentication, security, handover control, network selection, status reporting, QoS, and network pages and broadcasts. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

Figure 7:
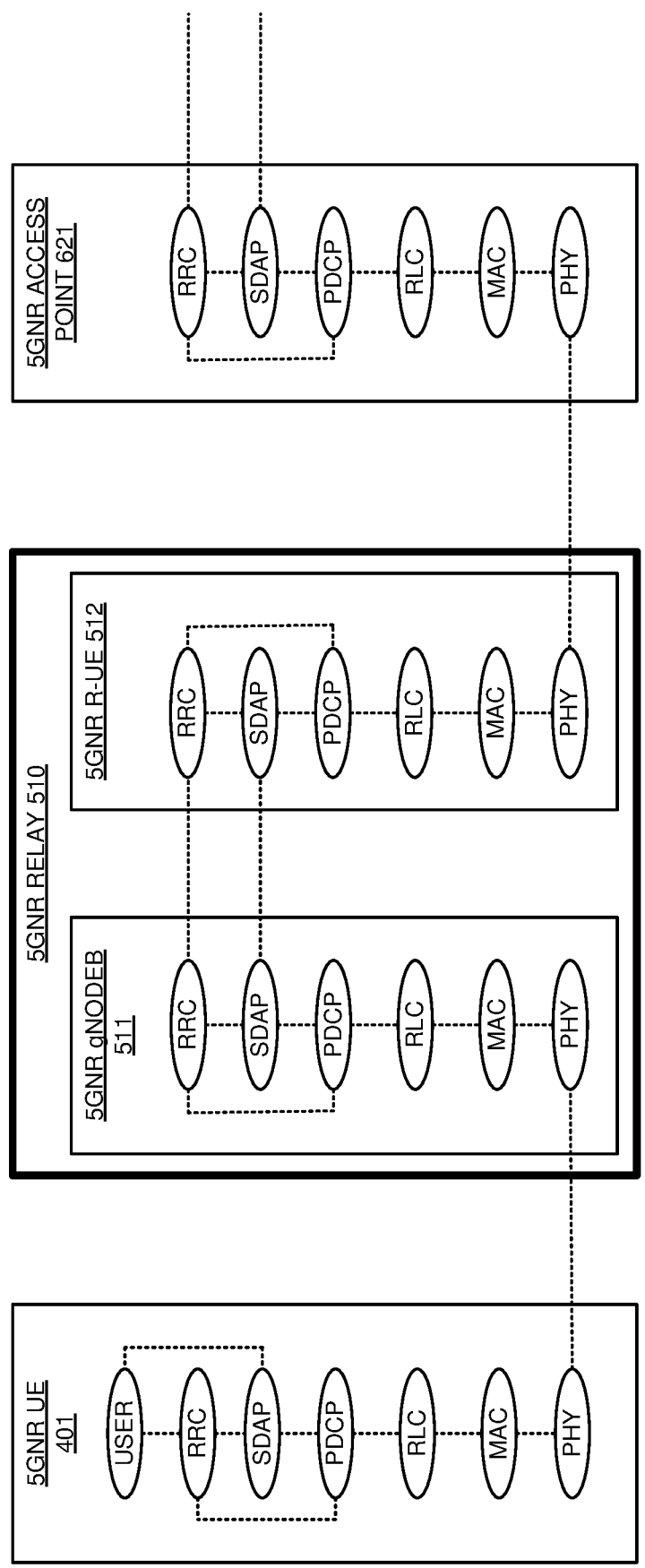
FIG. 7 illustrates the operation of the 5GNR relay to mitigate cross-relay interference.

FIG. 7 illustrates the operation of 5GNR relay 510 that is served by 5GNR access point 621 to mitigate cross-relay interference for UE 401. Initially, the PHYs of UE 401 and 5GNR relay 510 are not linked. Initially, the PHYs of 5GNR relay 510 and 5GNR access point 621 are not linked. 5GNR access point 621 and other wireless access points (not shown) each broadcast their own pilot signals. 5GNR relay 510 powers-up and loads its network applications.

The RRC in R-UE 512 directs the PHY to scan for a pilot signal and determine pilot signal strength. When the PHY reports the pilot signal and strength for 5GNR access point 621, the RRC in R-UE 512 signals the RRC in gNodeB 512 to direct its PHY to detect interference. The RRC in R-UE 512 transfers a test signal through the SDAP, PDCP, RLC, MAC, and PHY to 5GNR access point 621. The PHY in gNodeB 512 detects interference for the test signal and signals the interference level to the RRC which signals the interference for the test signal to the RRC in R-UE 512 which calculates the interference it would receive from the transmitter of the PHY in gNodeB 512. The RRC in R-UE 512 repeats the test for additional 5GNR access points. The RRC in R-UE 512 then selects 5GNR access point 621 because it has good signal strength and low interference. The PHYs in R-UE 512 and 5GNR access point 621 may now exchange user data and network signaling.

The RRC in UE 401 directs its PHY to scan for a pilot signal and determine pilot signal strength. When the PHY reports the pilot signal and strength for 5GNR gNodeB 511, the RRC in UE 401 signals the RRC in gNodeB 511 for attachment. After the exchange of network signaling, the PHYs in UE 401 and 5GNR relay 510 may now exchange user data and network signaling. The RRC in gNodeB 511 exchanges network signaling with R-UE 512, and the RRC in R-UE 512 exchanges network signaling with the RRC in 5GNR access point 621. The SDAP in gNodeB 511 exchanges user data with R-UE 512, and the SDAP in R-UE 512 exchanges user data with the SDAP in 5GNR access point 621.

The RRC in R-UE 512 may perform an optimization process during the access point testing. The RRC may direct its MAC/PHY to beamform the test signals using different beamforming matrices that should mitigate interference at gNodeB 511. For example, the beamforming matrices may null signal transmissions toward gNodeB 511 in various ways. The RRC correlates interference levels from gNodeB 511 to the different beamforming matrices and calculates the cross-relay interference levels it would receive from the transmitter of the PHY at gNodeB 511. The RRC selects its serving wireless access points based on their signal strength and their calculated interference level based on the beamforming. After the selection, R-UE 512 wirelessly transmits user data and network signaling to a selected wireless access point 621 using the specific beamforming matrix which corresponds to a suitable interference level from gNodeB 511.

The RRC may direct its PHY to switch the test signal antennas using different switch antenna positions that should mitigate interference at gNodeB 511. The RRC correlates interference levels from gNodeB 511 to the different switch antenna positions and calculates the cross-relay interference level it would receive from the transmitter of gNodeB 511. The RRC selects its serving wireless access points based on their signal strength and their interference level based on the switching. After the selection, R-UE 512 wirelessly transmits user data and network signaling to a selected wireless access point 621 using the specific switch position which corresponds to a suitable interference level from gNodeB 511.

The RRC may direct its PHY to physically move the test antennas to different antenna positions that should mitigate interference at gNodeB 511. The RRC correlates interference levels from gNodeB 511 to the different antenna positions and calculates the cross-relay interference level it would receive from the transmitter of gNodeB 511. The RRC selects its serving wireless access points based on their signal strength, signal quality, and their interference level based on the positioning. After the selection, R-UE 512 wirelessly transmits user data and network signaling to selected wireless access point 621 using the specific antenna position which corresponds to the optimal interference level at gNodeB 511.

If the RRC in R-UE 512 is not able to find an optimal access point because the calculated cross-relay interference levels are too high, it may direct gNodeB 511 to reduce the maximum transmit power level so that the calculated cross-relay interference levels may fall below a threshold, and the RRC in R-UE 512 is able to select an access point. After the selection, R-UE 512 wirelessly transfers user data and network signaling to a selected wireless access point and gNodeB 511 will be limited to a certain transmission power level.

The wireless data network circuitry described above comprises computer hardware and software that form special-purpose wireless relay circuitry to mitigate cross-relay interference when serving wireless user devices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless relay circuitry to mitigate cross-relay interference when serving wireless user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication relay comprising a user transceiver and a network transceiver, the method comprising:
    a network transceiver wirelessly detecting wireless access points, beamforming wireless test signals, and wirelessly transmitting the beamformed wireless test signals to the wireless access points;
    the user transceiver wirelessly detecting cross-relay interference levels when the network transceiver wirelessly transmits the beamformed wireless test signals to the wireless access points and transferring the cross-relay interference levels for the wireless access points to the network transceiver;
    the network transceiver selecting one of the wireless access points based on the cross-relay interference levels for the wireless access points;
    the network transceiver wirelessly exchanging user data with the selected one of the wireless access points and exchanging the user data with the user transceiver; and
    the user transceiver exchanging the user data with the network transceiver and wirelessly exchanging the user data with the wireless user devices.

2. The method of claim 1 further comprising:
    the network transceiver transferring test indications to the user transceiver when the beamformed wireless test signals are transferred to the wireless access points; and wherein
    the user transceiver wirelessly detecting the cross-relay interference levels when the network transceiver wirelessly transmits the beamformed wireless test signals to the wireless access points comprises detecting the cross-relay interference levels in response to the test indications.

3. The method of claim 1 wherein:
    the network transceiver beamforming and wirelessly transmitting the beamformed wireless test signals to the wireless access points comprises using different beamforming matrices for individual ones of the wireless access points;
    the user transceiver wirelessly detecting the cross-relay interference levels when the network transceiver wirelessly transmits the beamformed wireless test signals to the wireless access points and transferring the cross-relay interference levels for the wireless access points to the network transceiver comprises detecting the cross-relay interference levels when the network transceiver wirelessly transmits the beamformed wireless test signals using the different beamforming matrices for the individual ones of the wireless access points and transferring the cross-relay interference levels for the different beamforming matrices for the individual ones of the wireless access points to the network transceiver;
    the network transceiver selecting the one of the wireless access points based on the cross-relay interference levels for the wireless access points comprises selecting one of the beamforming matrices for selected the one of the wireless access points based on the cross-relay interference levels for the different beamforming matrices for the individual ones of the wireless access points; and the network transceiver wirelessly exchanging the user data with the selected one of the wireless access points comprises using the selected one of the beamforming matrices.

4. The method of claim 1 wherein:
the user transceiver comprises a Fifth Generation New Radio (5GNR) gNodeB; and
the network transceiver comprises a 5GNR Relay User Equipment (R-UE).

5. The method of claim 1 wherein:
the user transceiver comprises a Long Term Evolution (LTE) eNodeB; and
the network transceiver comprises a Fifth Generation New Radio (5GNR) Relay User Equipment (R-UE).

6. The method of claim 1 wherein:
the user transceiver comprises a Fifth Generation New Radio (5GNR) gNodeB; and
the network transceiver comprises a Long Term Evolution (LTE) Relay User Equipment (R-UE).

7. The method of claim 1 wherein:
the user transceiver comprises an Institute of Electrical and Electronic Engineers (IEEE) 802.11 (WIFI) node; and
the network transceiver comprises a Fifth Generation New Radio (5GNR) Relay User Equipment (R-UE).

8. The method of claim 1 wherein the network transceiver wirelessly detecting the wireless access points comprises performing a 360 degree wireless signal scan.

9. The method of claim 1 wherein the user transceiver and the network transceiver are collocated on a same tower.

10. The method of claim 1 wherein the user transceiver and the network transceiver are collocated in a same building.

11. A wireless communication relay comprising a user transceiver and a network transceiver, the wireless communication relay comprising:
a network transceiver configured to wirelessly detect wireless access points, beamform wireless test signals, and wirelessly transmitting the beamformed wireless test signals to the wireless access points;
the user transceiver configured to wirelessly detect cross-relay interference levels when the network transceiver wirelessly transmits the beamformed wireless test signals to the wireless access points and to transfer the cross-relay interference levels for the wireless access points to the network transceiver;
the network transceiver configured to select one of the wireless access points based on the cross-relay interference levels for the wireless access points;
the network transceiver configured to wirelessly exchange user data with the selected one of the wireless access points and exchange the user data with the user transceiver; and
the user transceiver configured to exchange the user data with the network transceiver and wirelessly exchange the user data with the wireless user devices.

12. The wireless communication relay of claim 11 further comprising:
the network transceiver configured to transfer test indications to the user transceiver when the beamformed wireless test signals are transferred to the wireless access points; and wherein the user transceiver wirelessly is configured to detect the cross-relay interference levels in response to the test indications to detect the cross-relay interference levels when the network transceiver wirelessly transmits the beamformed wireless test signals to the wireless access points.

13. The wireless communication relay of claim 11 wherein:
the network transceiver is configured to use different beamforming matrices for individual ones of the wireless access points to beamform and wirelessly transmit the beamformed wireless test signals to the wireless access points;
the user transceiver is configured to detect the cross-relay interference levels when the network transceiver wirelessly transmits the beamformed wireless test signals using the different beamforming matrices for the individual ones of the wireless access points and transfer the cross-relay interference levels for the different beamforming matrices for the individual ones of the wireless access points to the network transceiver to wirelessly detect the cross-relay interference levels when the network transceiver wirelessly transmits the beamformed wireless test signals to the wireless access points and transfer the cross-relay interference levels for the wireless access points to the network transceiver;
the network transceiver is configured to select one of the beamforming matrices for selected the one of the wireless access points based on the cross-relay interference levels for the different beamforming matrices for the individual ones of the wireless access points to select the one of the wireless access points based on the cross-relay interference levels for the wireless access points; and
the network transceiver is configured to use the selected one of the beamforming matrices to wirelessly exchange the user data with the selected one of the wireless access points.

14. The wireless communication relay of claim 11 wherein:
the user transceiver comprises a Fifth Generation New Radio (5GNR) gNodeB; and
the network transceiver comprises a 5GNR Relay User Equipment (R-UE).

15. The wireless communication relay of claim 11 wherein:
the user transceiver comprises a Long Term Evolution (LTE) eNodeB; and
the network transceiver comprises a Fifth Generation New Radio (5GNR) Relay User Equipment (R-UE).

16. The wireless communication relay of claim 11 wherein:
the user transceiver comprises a Fifth Generation New Radio (5GNR) gNodeB; and
the network transceiver comprises a Long Term Evolution (LTE) Relay User Equipment (R-UE).

17. The wireless communication relay of claim 11 wherein:
the user transceiver comprises an Institute of Electrical and Electronic Engineers (IEEE) 802.11 (WIFI) node; and
the network transceiver comprises a Fifth Generation New Radio (5GNR) Relay User Equipment (R-UE).

18. The wireless communication relay of claim 11 wherein the network transceiver is configured to perform a 360 degree wireless signal scan to wirelessly detect the wireless access points.

19. The wireless communication relay of claim 11 wherein the user transceiver and the network transceiver are collocated on a same tower.

20. The wireless communication relay of claim 11 wherein the user transceiver and the network transceiver are collocated in a same building.

* * * * *